United States Patent

[11] 3,566,237

[72] Inventors John Howard Moore
Redditch;
Derek Stanley Adams, Solihull, England
[21] Appl. No. 759,046
[22] Filed Sept. 11, 1968
[45] Patented Feb. 23, 1971
[73] Assignee Joseph Lucas (Industries) Limited
Birmingham, England
[32] Priority Sept. 21, 1967
[33] Great Britain
[31] 43036/67

[54] CONTROL CIRCUIT FOR REGULATING THE MEAN CURRENT FLOW IN A LOAD
5 Claims, 2 Drawing Figs.
[52] U.S. Cl. .................................................. 318/332, 318/341
[51] Int. Cl. .................................................... H02p 5/16, H02p 7/28
[50] Field of Search............................................. 318/341, 332, 345, 346, 432; 307/265; 329/73, 74; (Inquired) 323/18

[56] References Cited
UNITED STATES PATENTS
3,309,592   3/1967   Favre ........................... 318/345X
3,389,318   6/1968   Hoyt, Jr. ....................... 318/345

*Primary Examiner*—Oris L. Rader
*Assistant Examiner*—Robert J. Hickey
*Attorney*—Holman & Stern

ABSTRACT: A control circuit particularly designed for regulating the mean current flow in a traction motor, but usable for other purposes, includes a switching device in circuit with the load. The switching device is turned on and off, and current sensing means is provided operable when the device is in one condition, either on or off, to sense the current flow in the load and turn the switching means to its opposite state when the current has a predetermined magnitude. Timing means is then provided for determining how long the switching device remains in the switched state.

CONTROL CIRCUIT FOR REGULATING THE MEAN CURRENT FLOW IN A LOAD

This invention relates to a control circuit for regulating the mean current flow in a load.

A circuit according to the invention comprises a switching device in circuit with the load, the switching device having an on condition and an off condition, switching means for turning the device on and off, current sensing means operable when the device is in one condition to sense the current flow in the load and control the switching means to drive the device to its other condition when the current has a predetermined magnitude, and timing means for maintaining the switching means in said other condition for length of time which varies inversely with the time for which said switching device was in said one condition so as to determine the maximum operating frequency of the control circuit.

In most circuits the current sensing means operates when the switching device is turned on, and turns the switching device off when the current rises to a predetermined value. The time for which the switching device is off is then varied in accordance with the time taken to reach the predetermined current during the previous on period, and reduces as the time taken to reach the predetermined current increases. The relationship need not be a direct inverse proportionality, as long as the maximum frequency is restricted to a predetermined value, which may be variable. It is, of course, also possible for the current sensing means to operate when the switching device is turned off, and to turn the switching device on again when the current falls to a predetermined value. In these circumstances the on time is adjusted by the timing means in accordance with the time taken for the current to fall to the predetermined value.

The invention is particularly concerned with the control of the current flowing in an electric traction motor, for example in a road vehicle, and in such an arrangement the predetermined magnitude of the current is controlled in accordance with the position of a throttle pedal.

In the accompanying drawings.

Figure 1:
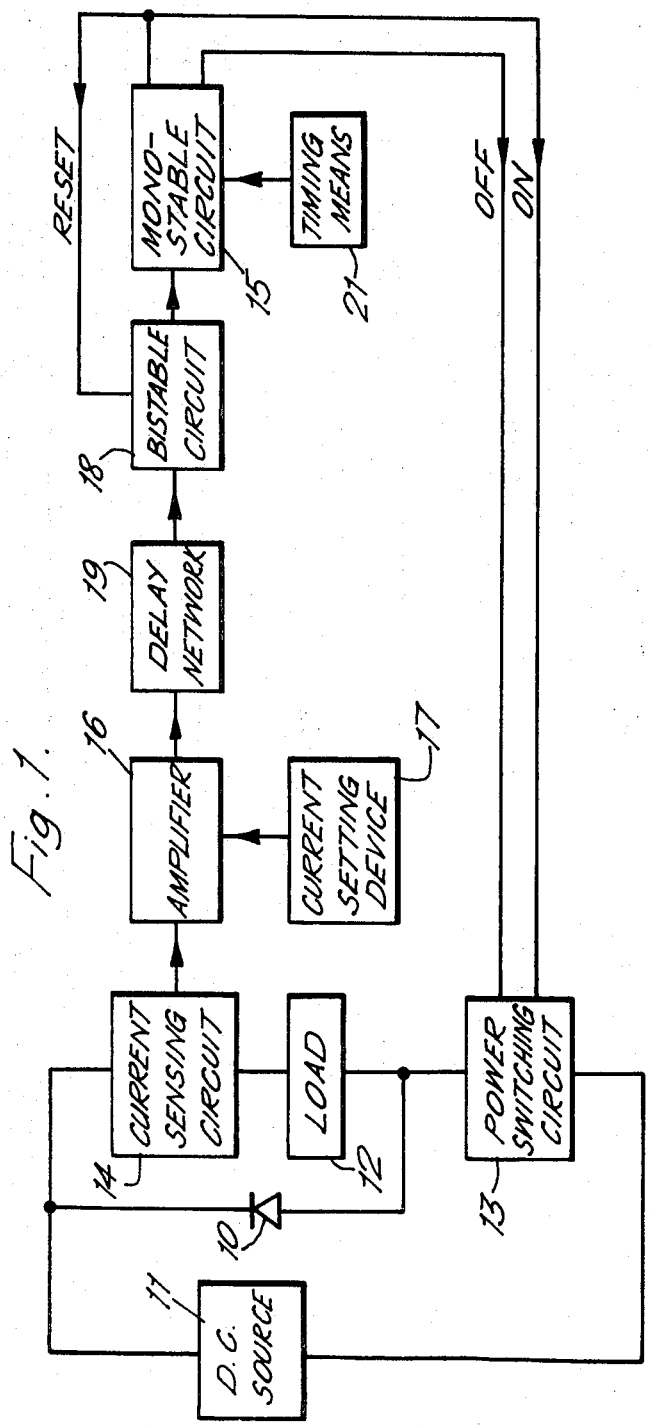
FIG. 1 is a block diagram illustrating one example of the invention.

Referring first to FIG. 1, current flow from a DC source 11 to a load 12 is controlled by a power switching circuit 13 in series with the load, and the current flowing in the load is sensed by a current sensing circuit 14 in series with the load and power switching circuit 13. A diode 10 is connected across the series connection of the load 12 and circuit 14. The power switching circuit 13 is controlled by a monostable circuit 15 which in its stable condition permits the circuit 13 to turn on so that current flows in the load. Whilst current is flowing in the load, the circuit 14 provides an input to an amplifier 16 which compares the input from the circuit 14 with an input from a current setting device 17, which in the case of a traction motor for a vehicle will provide an input signal dependent on the position of the throttle pedal. When the current flow in the load reaches the value set by the device 17, the amplifier 16 provides an input to a bistable circuit 18 by way of a delay network 19 which it is found improves the stability of the system. As soon as the bistable circuit 18 is driven from its first state to its second state, it operates the monostable circuit, driving the circuit 15 to its unstable position, at which point the circuit 15 produces an output to turn the circuit 13 off, so that current decays in the load 12. Timing means 21 is provided for holding the monostable circuit 15 in its unstable condition for a period of time dependent on the time taken for the current flow in the load 12 to rise to the predetermined value, and at the end of this period the monostable circuit reverts to its stable condition, and turns the circuit 13 on again, and at the same time resets the bistable circuit 18. As previously explained, the timing means operates to vary the off time inversely with the on time, so maintaining the maximum frequency of operation of the system below a predetermined value.

Figure 2:
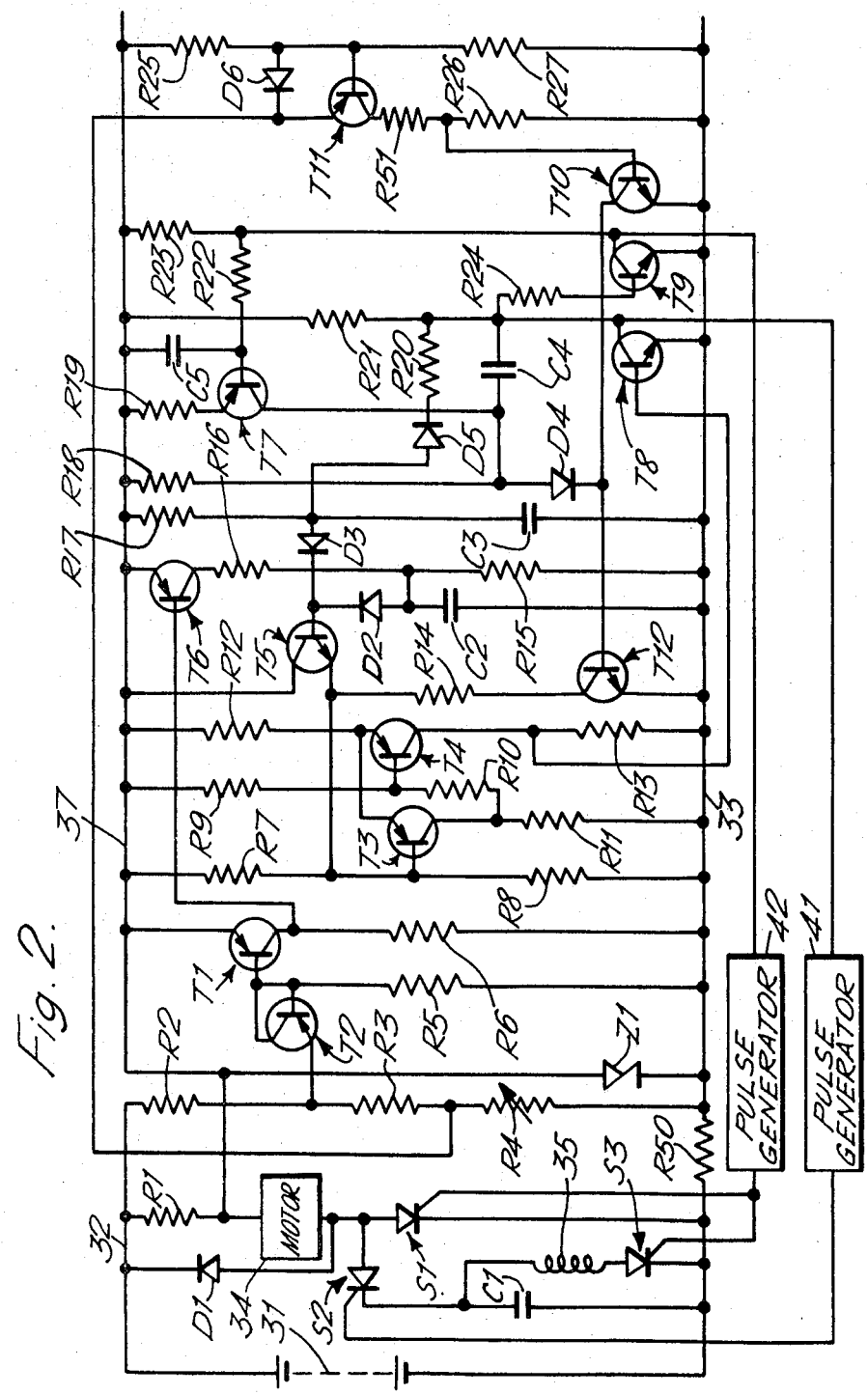
FIG. 2 is a full circuit diagram illustrating the preferred embodiment of the invention.

The arrangement shown in FIG. 2 utilizes the basic component shown in FIG. 1, together with a number of additional components the purpose of which will become clear on a detailed consideration of FIG. 2.

Referring now to FIG. 2, the arrangement shown is intended for use on a battery-driven vehicle, and includes a battery 31 providing power to a positive supply line 32 and through a resistor R50 to a negative supply line 33, which is connected to the line 37 through a Zener diode Z1. Connected across the lines 32, 33 in series are a current sensing resistor R1, an electric traction motor 34 and the anode-cathode path of a thyristor S1. The resistor R1 and motor 34 are bridged by a diode D1, and the anode of the thyristor S1 is connected to the anode of a thyristor S2, the cathode of which is connected through a capacitor C1 to the line 33. The capacitor C1 is bridged by an inductor 35 in series with the anode-cathode path of a thyristor S3.

The battery also supplies power through the resistor R1 to a supply line 37 to which is connected the emitter of a PNP transistor T1, the collector of which is connected through a resistor R6 to the line 33. The base of the transistor T1 is connected through a resistor R5 to the line 33, and is also connected to the base and to the collector of an PNP transistor T2, the emitter of which is connected through a resistor R2 to the line 32, and is further connected to the line 33 through a resistor R3 in series with the variable resistor R4.

Connected in series between the lines 37, 33 are a resistor R7 and a resistor R8 in series, the junction of these resistors being connected to the base of a PNP transistor T3, the collector of which is connected to the line 33 through a resistor R11. The emitter of the transistor T3 is connected to the emitter of a PNP transistor T4, the emitter of which is also connected to the line 37 through a resistor R12. The base of the transistor T4 is connected through a resistor R10 to the collector of the transistor T3, and through a resistor R9 to the line 37, whilst the collector of the transistor T4 is connected through a resistor R13 to the line 33.

There is further provided an NPN transistor T5 the collector of which is connected to the line 37, and the emitter of which is connected to the junction of the resistors R7, R8, and is also connected through a resistor R14 to the collector of an NPN transistor T12 having its emitter connected to the line 33. The base of the transistor T12 is connected to the line 37 through the cathode-anode path of a diode D4 and the resistor R18 in series, whilst the base of the transistor T5 is connected to the line 33 through the cathode-anode path of a diode D2 and a capacitor C2 in series. The junction of the diode D2 and capacitor C2 is connected to the line 33 through a resistor R15, and is connected through a resistor R16 to the collector of PNP transistor T6, having its emitter connected to the line 37 and its base connected to the collector of the transistor T1. The base of the transistor T5 is further connected to the cathode of a diode D3 having its anode connected to the line 37 through a resistor R17, and its anode further connected to the line 33 through a capacitor C3.

The junction of the diode D4 and resistor R18 is connected to the collector of a PNP transistor T7, the emitter of which is connected through a resistor R19 to the line 37. The base of the transistor T7 is connected through a capacitor C5 to the line 37, and is also connected through a resistor R22 and a resistor R23 in series to the line 37, the junction of the resistors R22, R23 being connected to the collector of an NPN transistor T9 having its emitter connected to the line 33. The base of the transistor T9 is connected through a resistor R24 to the collector of an NPN transistor T8, the emitter of which is connected to the line 33, and the base of which is connected to the collector of the transistor T4. The collector of the transistor T8 is connected to the line 37 through a resistor R21, to the collector of the transistor T7 through a capacitor C4, and to the junction of the resistor R17 and capacitor C3 through a resistor R20 and the cathode-anode path of the diode D5 in series.

Also connected between the lines 37, 33 are a resistor R25 and a resistor R27 in series, the junction of these resistors being connected to the base of a PNP transistor T11, the collector of which is connected through resistors R51, R26 in series to the line 33, and the emitter of which is connected through the cathode-anode path of the diode D6 to the junction of the resistors R25, R27, and is also connected to the junction of the resistors R3, R4. The junction of the resistors R51, R26 is connected to the base of an NPN transistor T10, the emitter of which is connected to the line 33 and the collector of which is connected to the base of the transistor T12. The collector of which the transistor T8 is connected to a pulse generator 41 which when operated provides pulses to the gate of the thyristor S2, while the collector of the transistor T9 is connected to a pulse generator 42 which when operated provides pulses to the gates of the thyristors S1, S3. Both pulse generators derive their power form the battery 31.

In order to understand the operation of the control circuit, it will be convenient to consider first the operation of the three thyristors and their associated components in controlling current flow in the motor 34. At the commencement of a cycle of operation, the thyristors S1, S3 are off, and the thyristor S2 is on, so that current flows from the battery 31 through the motor 34 to charge the capacitor C1. When the capacitor C1 is charged, the current flow through the thyristor S2 reduces to zero, and so the thyristor S2 turns off, leaving the capacitor C1 charged.

At a later point in the cycle, the thyristor S1 is fired, and motor current flows. The thyristor S3 is fired at the same time as the thyristor S1, and permits discharge of the capacitor C1 through the oscillatory circuit including the inductor 35. The result of this is that the charge on the capacitor C1 reverses so that its upper plate is negative with respect to its other plate. The reversal of charge turns the thyristor S3 off. At the end of the cycle the thyristor S2 is fired again and permits discharge of the capacitor C1 through the thyristor S2 to reverse bias the thyristor S1, so that the thyristor S1 turns off and current flow in the motor decays. The thyristor S2 now charges the capacitor C1 again and another cycle commences.

Considering the operation of the control system assume that current is flowing through the motor 34. The current is sensed by the resistor R1 which constitutes the circuit 14 in FIG. 1, and the resistor R4 constitutes the device 17 in FIG. 1, determining the maximum current required in the load 34. The amplifier constituted by the transistors T1 and T2 and their associated components is of conventional form in which the transistor T2 provides temperature compensation for the base-emitter diode of the transistor T1, which receives base current by way of the resistor R5. The base voltage of the transistor T1 is determined by the resistor R4, whilst its emitter voltage is determined by the resistor R1, and the arrangement is such that the transistor T1 conducts until the current flowing through the resistor R1 reaches the predetermined value, at which point the transistor T1 turns off.

The bistable circuit includes transistors T3, T4, T5 and their associated components, and when transistor T1 is conducting, transistor T3 is on, and transistors T4, T5 are off. When the transistor T1 switches off, it removes the short circuit from the base-emitter of the transistor T6, which then conducts. The transistor T6 is part of the delay circuit, which also includes the capacitor C2, resistor R5, resistor R16 and diode D2, and the arrangement is such that after a predetermined delay determined by the capacitor C2, the base voltage of the transistor T5 rises sufficiently to cause it to conduct. When the transistor T5 conducts, the transistor T3 turns off and the transistor T4 turns on, so that the bistable circuit is in its other stable state.

The monostable circuit includes the transistors T12, T8 and T9, and in its stable state transistors T12 and T9 are conducting, transistor T9 receiving its base current by way of resistors R21 and R24, and transistor T12 receiving its base current through the resistor R18 and diode D4. When the bistable circuit switches to its second state and the transistor T4 conducts, the transistor T8 receives base current by way of the transistor T4, and conducts, so removing the base current from the transistor T9 which turns off. Furthermore, the current flowing through the resistor R18 is diverted through the capacitor C4 and the transistor T8, so that the transistor T12 turns off as well. The monostable circuit is now in its unstable condition, with the transistor T8 conducting, and the collector current of the transistor T8 operates the pulse generator 41 to fire the thyristor S2, so that the thyristor S1 is turned off as previously explained.

The transistor T12 has its base current restored as soon as the capacitor C4 has charged. The time taken for the capacitor C4 to charge depends on the state of conduction of the transistor T7, which in turn depends upon the charge on the capacitor C5, which in turn depends on the time taken for the current flow in the resistor R2 to reach the value set by the resistor R4. Thus, the longer the are on period, the greater the charge on the capacitor C5, the greater the conduction of the transistor T7, and the shorter the time taken for the capacitor C4 to charge.

When the capacitor C4 has charged and base current is restored to the transistor T12, current can flow through the transistor T12, the resistor R14 and the base-emitter of the transistor T3 and resistor R12 to turn the transistor T3 on again, so that the bistable circuit reverts to its first state with transistor T4 switched off. As soon as the transistor T4 is switched off, the transistor T8 is switched off because it receives its base current through the transistor T4, and so the transistor T9 switches on again and the monostable circuit reverts to its stable condition. The rise in collector current of the transistor T9 operates the pulse generator 42 to fire the thyristor S1 and the thyristor S3 as previously explained, and the capacitor C5 starts to charge again.

The arrangement thus far described corresponds with block diagram of FIG. 1, and for many circuits the components which have not been mentioned in FIG. 2 are not necessary. However with the particular form of switch circuit shown in FIG. 2, difficulty can arise if the on period of the thyristor S1 is above a predetermined value, because during the on period the charge on the capacitor C1 tends to leak away, so that if the on period is extremely long, the voltage across the capacitor C1 will fall to a value such that when the thyristor S2 is fired, the thyristor S1 will not be switched off. In order to avoid this difficulty, an overriding control is provided for limiting the maximum time for which the circuit can be in the on condition, irrespective of whether the current flow in the resistor R1 reaches the desired value or not. The override circuit includes the capacitor C3, which when the thyristor S1 is conducting charges through the resistor R17. In normal operation, when the on time is below the predetermined maximum permissible, the transistor T6 will be turned on by the amplifier when the predetermined current is reached in the resistor R1, and the capacitor C3 will discharge through the transistor T8, and start to charge again only when the thyristor S1 conducts again and the transistor T8 is off. However, if the on period exceeds the predetermined value, the charge on the capacitor C3 rises to a value sufficient to turn the transistor T5 on, and in these circumstances the circuit acts as if the predetermined current in the resistor R1 has been reached, and the off period occurs as explained above. A discharge path for the capacitor C3 in these circumstances is provided by way of diode D5, resistor R20 and the transistor T8.

Using the particular form of switching circuit employing the thyristors S1, S2, S3 it is important that the thyristor S2 should be fired first so that the capacitor C1 is charged. If the circuit is switched on initially but load current is prevented from flowing, the capacitor C3 still charges, and after a predetermined time it causes the transistor T5 to conduct, so that the circuit reacts as if load current is flowing, but the time taken for it to buildup to the predetermined value is too long. In these circumstances the thyristors S1, S3 will be fired before the thyristor S2, which leads to faulty operation. In order to prevent this difficulty, it is necessary to inhibit the override circuit including the capacitor C3 when the throttle is in its rest position. This of course could be done quite simply by having a throttle-controlled switch in series with the capacitor C3, but it is preferred to sense current flow in the series circuit R2, R3, R4. For this purpose the transistor T11 is biased to conduction, and a current flows through the transistor T11 dependent on the setting of the resistor R4. As long as the throttle is in its rest position, the transistor T11 conducts and provides base current to the transistor T10, conduction of which holds the transistor T12 off, so that the monostable circuit cannot be driven from its stable state to its unstable state.

We claim:

1. A control circuit for regulating the mean current flow in a load, comprising a switching device in circuit with the load, the switching device having an on condition and an off condition, switching means for turning the device on and off, current sensing means operable when the device is in one condition to sense the current flow in the load and control the switching means to drive the device to its other condition when the current has a predetermined magnitude, and timing means for maintaining the switching means in said other condition for a length of time which varies inversely with the time for which said switching device was in said one condition so as to determine the maximum operating frequency of the control circuit.

2. A circuit as claimed in claim 1 in which said one condition is the on condition of the switching device.

3. A circuit as claimed in claim 1 in which said one condition is the off condition of the switching device.

4. A circuit as claimed in claim 1 in which said maximum operating frequency is variable.

5. A circuit as claimed in claim 1 in which the load is the traction motor of a vehicle having a throttle pedal the position of which determines said predetermined magnitude.